(12) United States Patent
Ichibangase et al.

(10) Patent No.: US 8,863,606 B2
(45) Date of Patent: Oct. 21, 2014

(54) ROBOT WRIST STRUCTURE AND ROBOT

(75) Inventors: Atsushi Ichibangase, Kitakyushu (JP);
Takashi Sanada, Kitakyushu (JP); Kei Kamohara, Kitakyushu (JP)

(73) Assignee: Kabushiki Kaisha Yaskawa Denki, Kitakyushu-Shi, Fukuoka (JP)

( * ) Notice: Subject to any disclaimer, the term of this patent is extended or adjusted under 35 U.S.C. 154(b) by 311 days.

(21) Appl. No.: 13/283,713

(22) Filed: Oct. 28, 2011

(65) Prior Publication Data
US 2012/0111135 A1    May 10, 2012

(30) Foreign Application Priority Data

Nov. 4, 2010   (JP) ................................. 2010-247656

(51) Int. Cl.
| | |
|---|---|
| B25J 17/00 | (2006.01) |
| B25J 17/02 | (2006.01) |
| B25J 18/00 | (2006.01) |
| B25J 19/00 | (2006.01) |

(52) U.S. Cl.
CPC .......... B25J 17/0283 (2013.01); B25J 19/0025 (2013.01); *Y10S 901/29* (2013.01); *Y10S 901/42* (2013.01); *Y10S 901/15* (2013.01)
USPC .................. 74/490.02; 74/490.06; 74/490.01; 901/29; 901/42; 901/15

(58) Field of Classification Search
CPC . B25J 19/0025; B25J 19/0029; B25J 17/0283
USPC ............... 74/490.01–490.03, 490.05, 490.06; 219/125.1, 127, 137 PS, 137.9; 414/918; 901/15, 23, 28, 29, 41–43
See application file for complete search history.

(56) References Cited

U.S. PATENT DOCUMENTS

| | | | |
|---|---|---|---|
| 6,696,810 B2 * | 2/2004 | Uematsu et al. | ......... 318/568.21 |
| 7,322,258 B2 | 1/2008 | Shiraki et al. | |

(Continued)

FOREIGN PATENT DOCUMENTS

| | | |
|---|---|---|
| CN | 1660546 A | 8/2005 |
| CN | 1733436 A | 2/2006 |

(Continued)

OTHER PUBLICATIONS

The extended European search report dated Dec. 30, 2011.

(Continued)

*Primary Examiner* — Troy Chambers
*Assistant Examiner* — Jake Cook
(74) *Attorney, Agent, or Firm* — Bacon & Thomas, PLLC

(57) ABSTRACT

A robot wrist structure includes a first wrist arm rotatable about a first axis, a second wrist arm provided in a tip end portion of the first wrist arm and configured to swing about a second axis substantially intersecting the first axis, a wrist flange provided in a tip end portion of the second wrist arm and configured to rotate about a third axis in a skew position with respect to the second axis, an intermediate member fixed to the wrist flange, and a cable bundle connected to an end effector fixed to the intermediate member. The cable bundle extends through the second wrist arm, the wrist flange and the intermediate member and drawn out from the intermediate member to reach the end effector.

9 Claims, 10 Drawing Sheets

(56) References Cited

U.S. PATENT DOCUMENTS

| | | | |
|---|---|---|---|
| 7,422,412 B2* | 9/2008 | Akaha | 414/744.5 |
| 7,631,573 B2* | 12/2009 | Kidooka et al. | 74/490.02 |
| 7,915,773 B2* | 3/2011 | Takahashi | 310/88 |
| 2004/0261562 A1 | 12/2004 | Haniya et al. | |
| 2005/0189333 A1* | 9/2005 | Nakagiri et al. | 219/125.1 |
| 2006/0101936 A1* | 5/2006 | Inoue et al. | 74/490.01 |
| 2006/0104791 A1* | 5/2006 | Nihei et al. | 414/737 |
| 2006/0117896 A1 | 6/2006 | Kidooka et al. | |
| 2007/0012672 A1* | 1/2007 | Inoue et al. | 219/137.9 |
| 2010/0000364 A1* | 1/2010 | Kagawa et al. | 74/490.02 |
| 2010/0229671 A1* | 9/2010 | Haniya et al. | 74/490.02 |
| 2011/0219906 A1* | 9/2011 | Haniya et al. | 74/490.03 |

FOREIGN PATENT DOCUMENTS

| | | |
|---|---|---|
| CN | 1781681 A | 6/2006 |
| EP | 1 666 218 | 6/2006 |
| EP | 1 829 652 | 9/2007 |
| JP | H06-278078 | 10/1994 |
| JP | 2006-026748 | 2/2006 |
| JP | 2006-159372 | 6/2006 |
| JP | 4099628 | 6/2008 |
| JP | 2009-178828 | 8/2009 |
| WO | 2010/052031 | 5/2010 |

OTHER PUBLICATIONS

The Japanese Office Action dated Feb. 19, 2013 and the English translation thereof.

* cited by examiner

ROBOT WRIST STRUCTURE AND ROBOT

FIELD OF THE INVENTION

The present invention relates to a robot wrist structure and a robot.

BACKGROUND OF THE INVENTION

Japanese Patent No. 4099628 discloses an industrial robot in which an end effector is attached to a tip end of a wrist unit provided at a tip end of an arm and in which a cable for supplying power, signals or materials to the end effector is arranged to extend from the arm to the end effector. In this industrial robot, the end effector is fixed to the wrist unit through an intermediate member. The intermediate member includes a first flange directly attached to the wrist unit, a second flange arranged in a parallel spaced-apart relationship with the first flange and directly attached to the end effector, and a connecting member for interconnecting the first and second flanges at the positions spaced apart from the rotation axes of the first and second flanges so that a space for the passage of the cable can be secured between the first and second flanges. The cable extends through the space between the first and second flanges across the rotation axes of the first and second flanges which are coaxial with the tip end shaft of the wrist unit.

SUMMARY OF THE INVENTION

The present invention provides a robot wrist structure and a robot, which are capable of reducing interference thereof with peripheral devices.

In accordance with a first aspect of the present invention, there is provided a robot wrist structure including: a first wrist arm rotatable about a first axis; a second wrist arm provided in a tip end portion of the first wrist arm and configured to swing about a second axis substantially intersecting the first axis; a wrist flange provided in a tip end portion of the second wrist arm and configured to rotate about a third axis in a skew position with respect to the second axis; an intermediate member fixed to the wrist flange; and a cable bundle connected to an end effector fixed to the intermediate member, the cable bundle extending through the second wrist arm, the wrist flange and the intermediate member and being drawn out from the intermediate member to reach the end effector.

In accordance with a second aspect of the present invention, there is provided a robot including: a swing arm; a first wrist arm provided in a tip end portion of the swing arm and configured to rotate about a first axis; a second wrist arm provided in a tip end portion of the first wrist arm and configured to swing about a second axis substantially intersecting the first axis; a wrist flange provided in a tip end portion of the second wrist arm and configured to rotate about a third axis in a skew position with respect to the second axis; an intermediate member fixed to the wrist flange; and a cable bundle extending through the second wrist arm, the wrist flange and the intermediate member, the cable bundle being drawn out from the intermediate member.

In accordance with a third aspect of the present invention, there is provided a robot including: a swing arm; a first wrist arm provided in a tip end portion of the swing arm and configured to rotate about a first axis; a second wrist arm provided in a tip end portion of the first wrist arm and configured to swing about a second axis substantially intersecting the first axis; a wrist flange provided in a tip end portion of the second wrist arm and configured to rotate about a third axis in a skew position with respect to the second axis; an intermediate member fixed to the wrist flange; and a cable bundle connected to an end effector fixed to the intermediate member, the cable bundle extending through the second wrist arm, the wrist flange and the intermediate member, the cable bundle being drawn out from the intermediate member and arranged to reach the end effector.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE PREFERRED EMBODIMENTS

For the sake of understanding of the present invention, one embodiment of the present invention will now be described with reference to the accompanying drawings which form a part hereof. In the respective drawings, it is sometimes the case that those portions having nothing to do with the description are not illustrated.

Figure 1A:
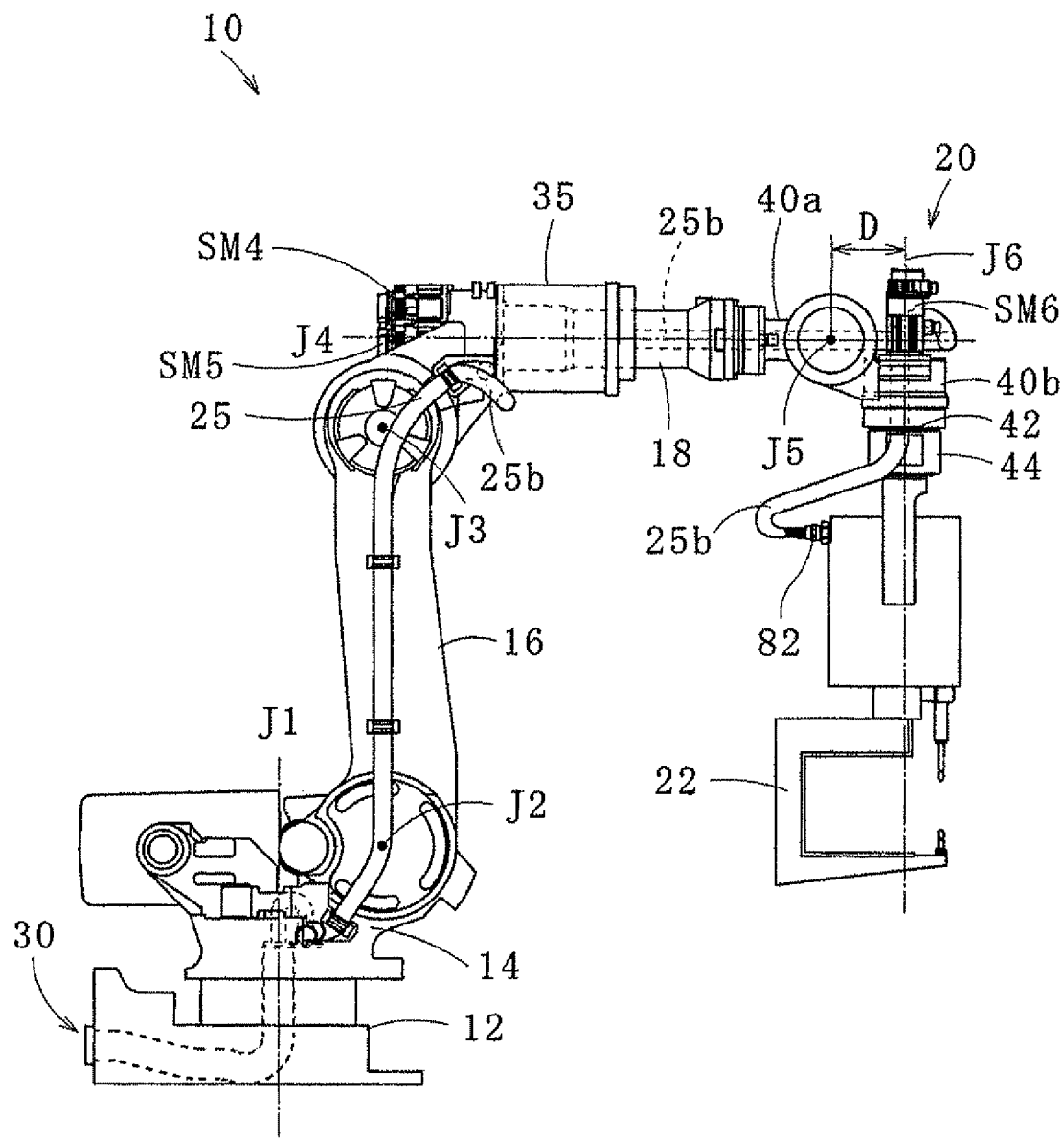
FIGS. 1A to 1C are respectively side, plan and front views of a robot according to one embodiment of the present invention.
Figure 1B:
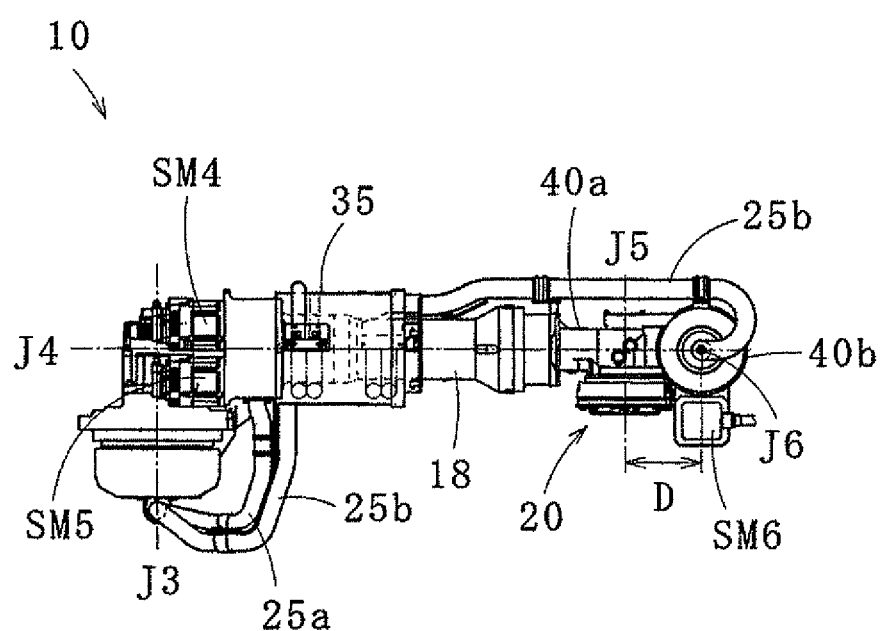
Figure 1C:
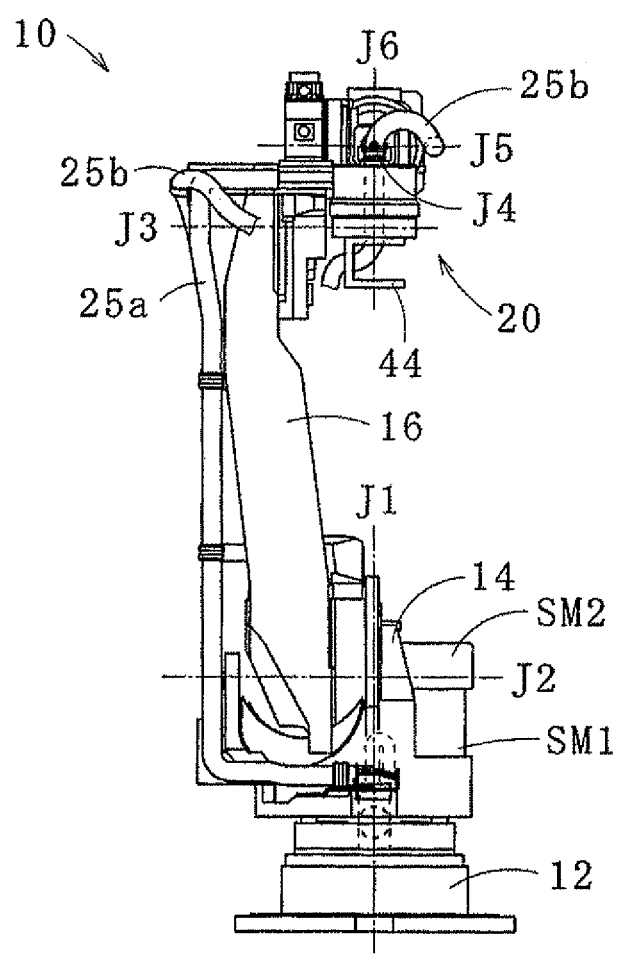

Referring to FIGS. 1A to 1C, a spot welding robot 10 (one example of robots) according to one embodiment of the present invention includes a base 12, a swivel unit 14, a lower arm 16, an upper arm 18, and a wrist unit 20. The spot welding robot 10 further includes a spot welding gun (one example of end effectors) 22 provided at the tip end of the wrist unit 20 and can perform a spot welding work. The spot welding robot 10 is, e.g., a six-axis industrial robot (with joint axes J1 to J6).

The joint axis J1 is arranged to intersect an installation surface on which the spot welding robot 10 is installed. The joint axis J2 is arranged substantially parallel to the installation surface. The joint axis J3 is arranged substantially parallel to the joint axis J2. The joint axis J4 (one example of a first axis) is arranged to intersect the joint axis J1. The term "intersect" used herein may not be the intersection in the strict meaning. In other words, the term "intersect" is intended to mean "substantially intersecting" with permission of errors in design and manufacture (This definition holds true in the following description). The joint axis J5 (one example of a second axis) is arranged to intersect the joint axis J4. The joint axis J6 (one example of a third axis) is arranged to intersect the joint axis J4. The joint axis J6 does not intersect the joint axis J5 and is offset by a distance D when the spot welding robot 10 is seen in a side or plan view (see FIGS. 1A and 1B). In other words, the joint axes J5 and J6 are in a skew position with respect to each other.

The base 12 is fixed to the installation surface for installation of the spot welding robot 10. The swivel unit 14 is rotatably provided on the base 12 and can rotate about the joint axis J1 (a swivel axis). The swivel unit 14 is driven by a first servo motor SM1 (see FIG. 1C).

The lower arm 16 has a base end portion supported on the swivel unit 14 to be rotatable about the joint axis J2. Thus, the lower arm 16 can swing in the front-rear direction (left-right direction in FIG. 1A). The lower arm 16 is driven by a second servo motor SM2.

Figure 2:
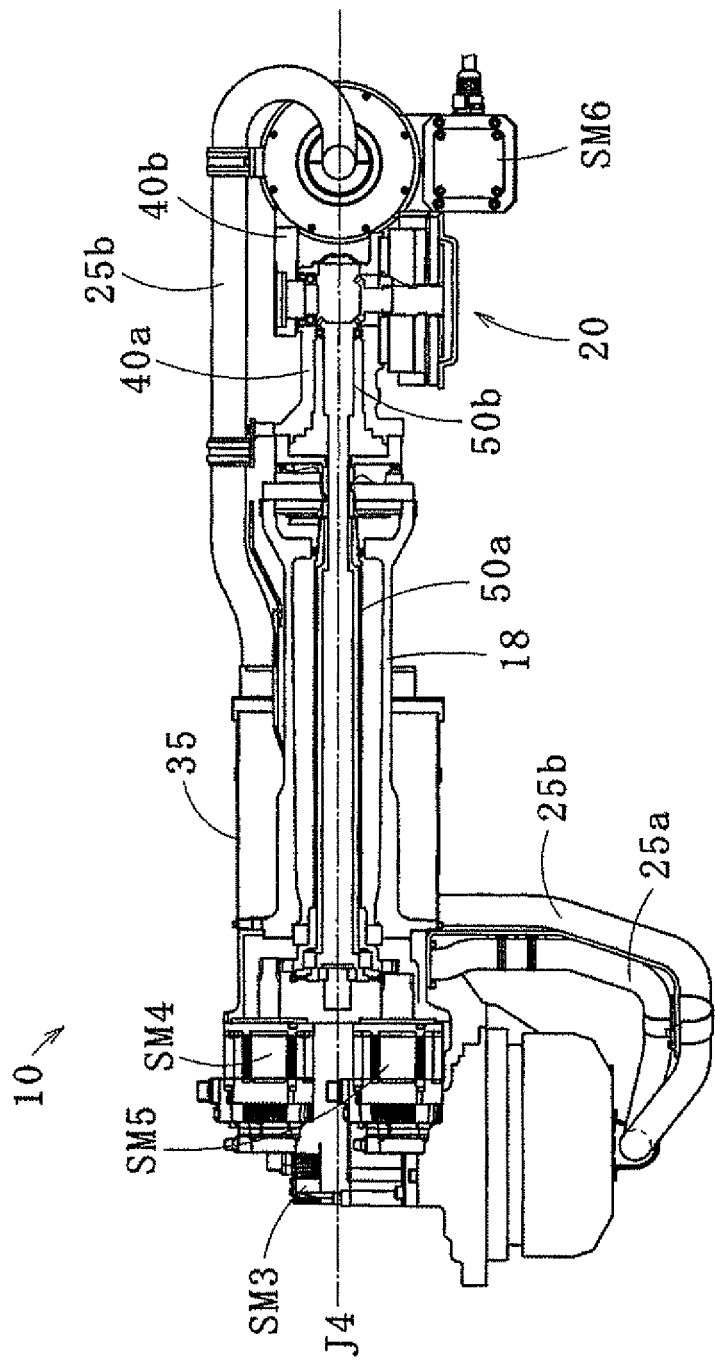
FIG. 2 is a structural view of the robot.

The upper arm 18 has a base end portion supported on the tip end portion of the lower arm 16 to be rotatable about the joint axis J3. Thus, the upper arm 18 can swing in the up-down direction. The upper arm 18 is driven by a third servo motor SM3 (see FIG. 2).

The wrist unit 20 is attached to the tip end portion of the upper arm 18. The wrist unit 20 will be described later in detail.

A cable bundle unit 25 including first and second cable bundles 25a and 25b is arranged in the spot welding robot 10. The first cable bundle 25a is configured by binding with a Zipper Tube (registered trademark), e.g., electric cables connected to fourth and fifth servo motors SM4 and SM5 for driving the upper arm 18 and the wrist unit 20 and power supply lines and signal lines connected to encoders of the fourth and fifth servo motors SM4 and SM5. The second cable bundle 25b is connected to the spot welding gun 22 and sixth servo motor SM6 and is configured by binding together, e.g., a plurality of electric wires and so forth. For example, the second cable bundle 25b may be configured by binding together: power supply lines (three power supply lines including an earth line) connected to the spot welding gun 22; hoses (four hoses in total) for cooling the spot welding gun 22; a power supply line connected to a servo motor (not shown) for pressing an electrode of the spot welding gun 22 and a signal line connected to an encoder thereof; and a power supply line connected to the sixth servo motor SM6 and a signal line connected to an encoder thereof.

The first and second cable bundles 25a and 25b extend into the base 12 through a connection port 30 (see FIG. 1A) formed in the rear portion of the base 12 and are drawn out through the swivel unit 14.

The first cable bundle 25a is separated from the second cable bundle 25b on the side surface of the lower arm 16. The first cable bundle 25b is introduced into the upper arm 18 and is connected to the fourth and fifth servo motors SM4 and SM5 and the encoders thereof. In other words, the second cable bundle 25b is separated from the first cable bundle 25a on the side surface of the lower arm 16 and is introduced into a cable bundle guide portion 35 of the upper arm 18. In this regard, the cable bundle guide portion 35 holds therein the second cable bundle 25b a loosened state and, therefore, can guide the second cable bundle 25b that moves together with the rotation of the wrist unit 20 about the joint axis J4. The second cable bundle 25b comes out from the cable bundle guide portion 35 and extends along the side surface of the upper arm 18. Then, the second cable bundle 25b is introduced into the wrist unit 20 from the side surface of the wrist unit 20 and is connected to the spot welding gun 22.

Next, the wrist unit 20 will be described in detail.

Figure 3A:
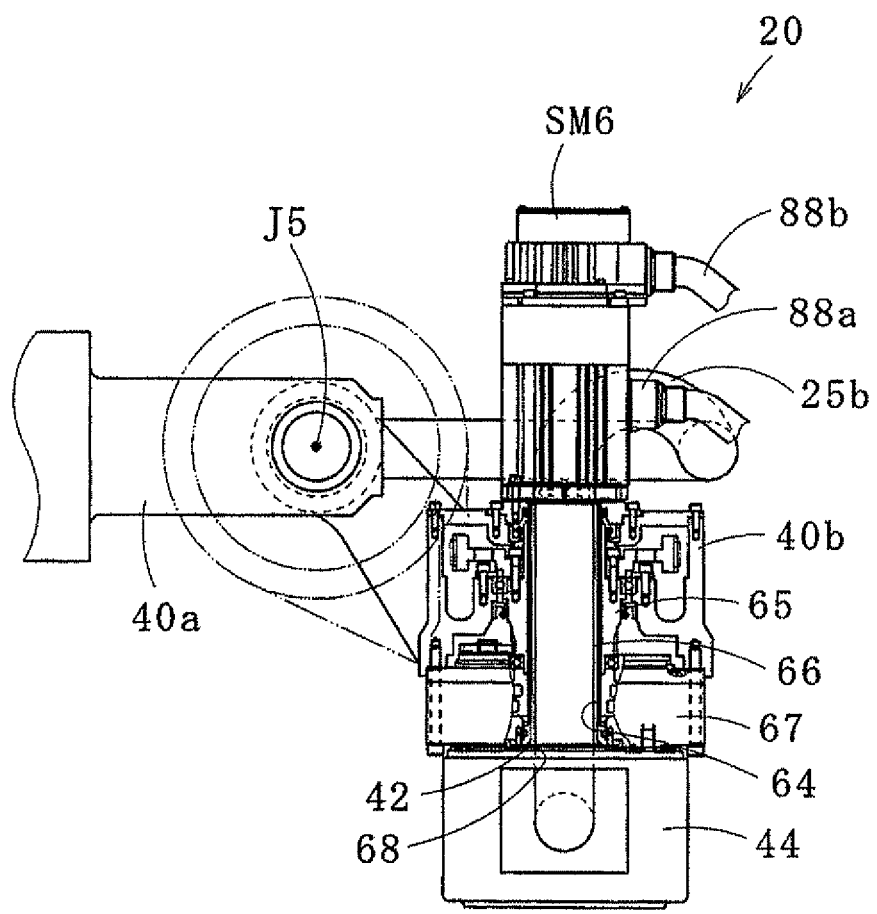
FIGS. 3A to 3C are respectively side, plan and front views illustrating an internal structure of a wrist unit of the robot.
Figure 3B:
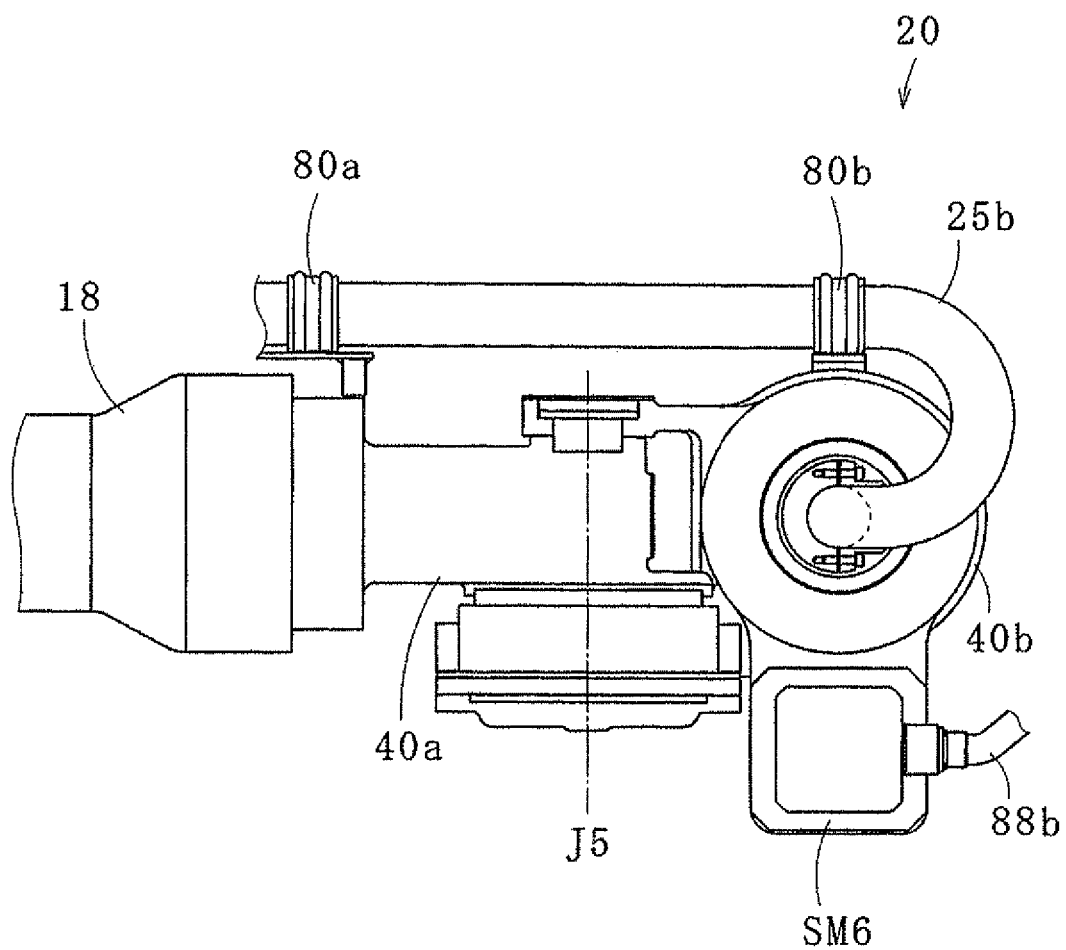
Figure 3C:
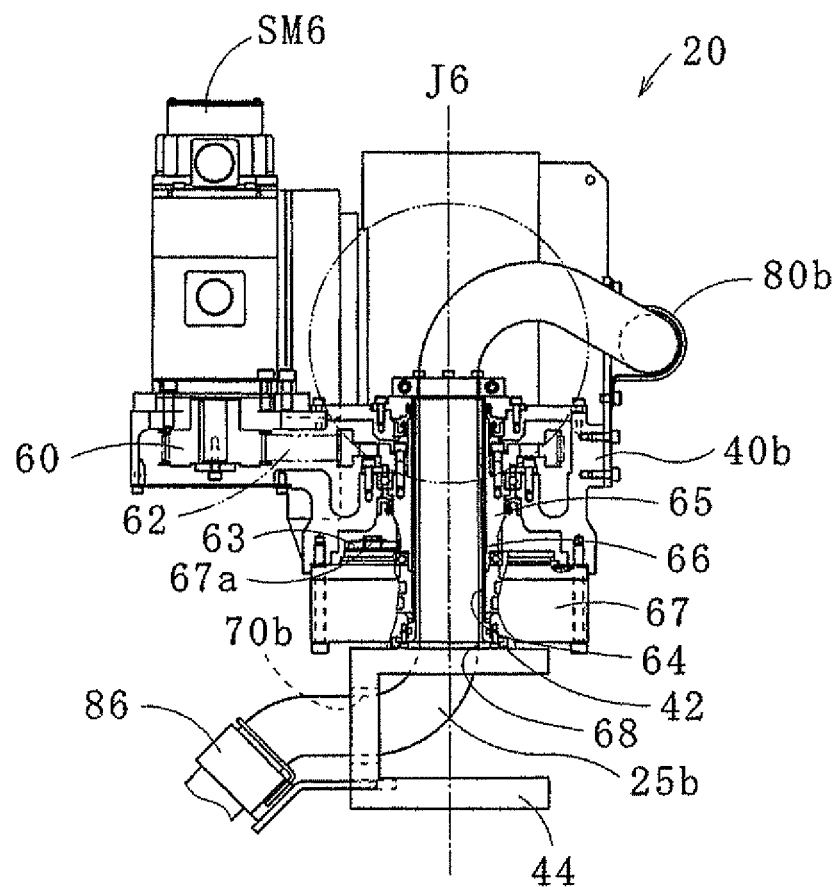

As shown in FIGS. 3A, 3B and 3C, the wrist unit 20 includes at least a first wrist arm 40a, a second wrist arm 40b, a wrist flange 42 and an intermediate member 44.

The first wrist arm 40a is provided in the tip end portion of the upper arm 18 and is rotatable about the joint axis J4. More specifically, the first wrist arm 40a is driven by the fourth servo motor SM4 via a hollow first drive shaft 50a extending through the upper arm 18 (see FIG. 2).

The second wrist arm 40b is provided in the tip end portion of the first wrist arm 40a and can rotate (swing) about the joint axis J5 substantially parallel to the joint axis J3. The second wrist arm 40b is driven by the fifth servo motor SM5 via a second drive shaft 50b extending through a hollow portion of the first drive shaft 50a.

The sixth servo motor SM6 is provided in the second wrist arm 40b. The sixth servo motor SM6 has a rotating shaft parallel to and offset from the joint axis J6. As shown in FIG. 1B, the sixth servo motor SM6 is provided on the opposite side of the joint axis J4 from the second cable bundle 25b (namely, on one side of the second wrist arm 40b) when seen in a plan view.

Referring to FIG. 3C, a pulley 60 is attached to the rotating shaft of the sixth servo motor SM6. Rotation of the pulley 60 is transferred to a hollow rotating body 65 via a timing belt 62, the rotating body 65 being rotatable about the joint axis J6. Rotation of the rotating body 65 is transferred to an input shaft 67a of a hollow speed reducer 67 via a gear 63.

A wrist-arm bore portion 64 extending along the joint axis J6 and opened at the opposite ends thereof is defined in the second wrist arm 40b by a hollow portion of the rotating body 65 and a hollow portion of the speed reducer 67.

The wrist flange 42 is, e.g., a disc-shaped member provided in the tip end portion of the second wrist arm 40b. The wrist flange 42 has a hole 68 formed in the rotation center portion thereof. The wrist flange 42 is fixed to an output shaft of the speed reducer 67 and is rotatable about the joint axis J6. The speed reducer 67 is, e.g., an RV speed reducer. Since the wrist flange 42 is driven by the sixth servo motor SM6 provided in the second wrist arm 40b, the present robot is structurally simple and highly reliable as compared with a conventional robot in which joint axes J4 to J6 are driven by concentric three-axis shafts extending through an upper arm.

One end of a hollow shaft 66 extending through the wrist-arm bore portion 64 is fixed to the rotation center portion of the wrist flange 42. Thus, the wrist flange 42 and the hollow shaft 66 are rotated together with the rotation of the sixth servo motor SM6.

Figure 4A:
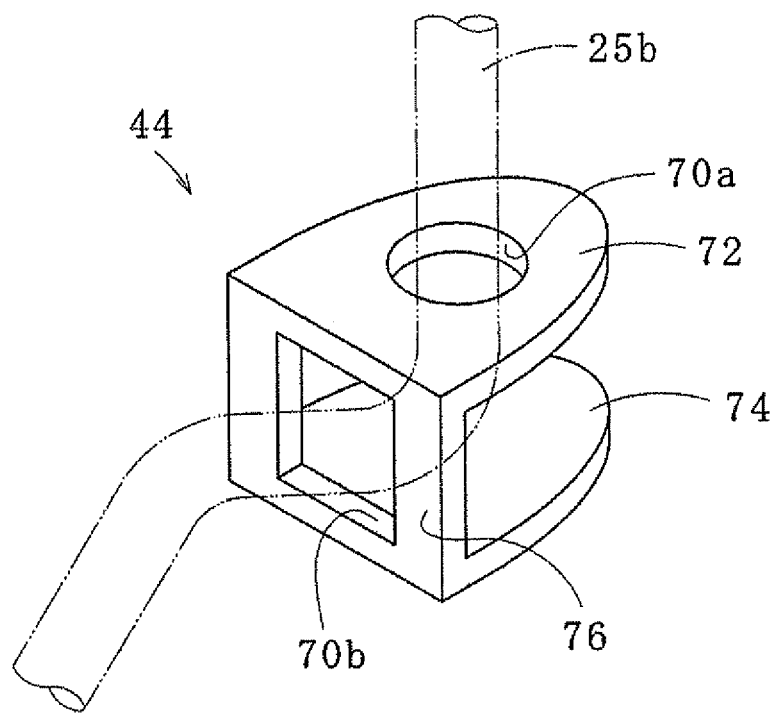
FIG. 4A is a perspective view depicting an intermediate member of the robot.
Figure 4B:
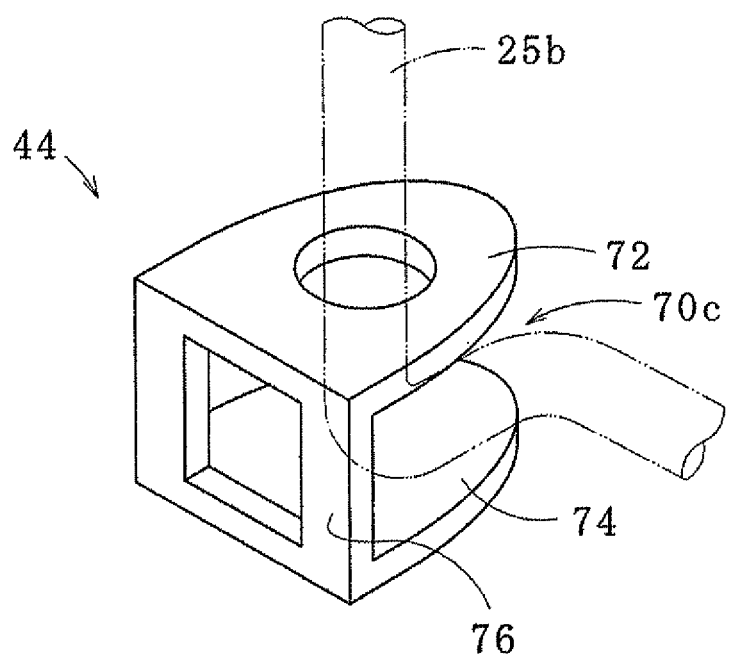
FIG. 4B is a view for explaining a second opening portion formed in the intermediate member of the robot.
Figure 4C:
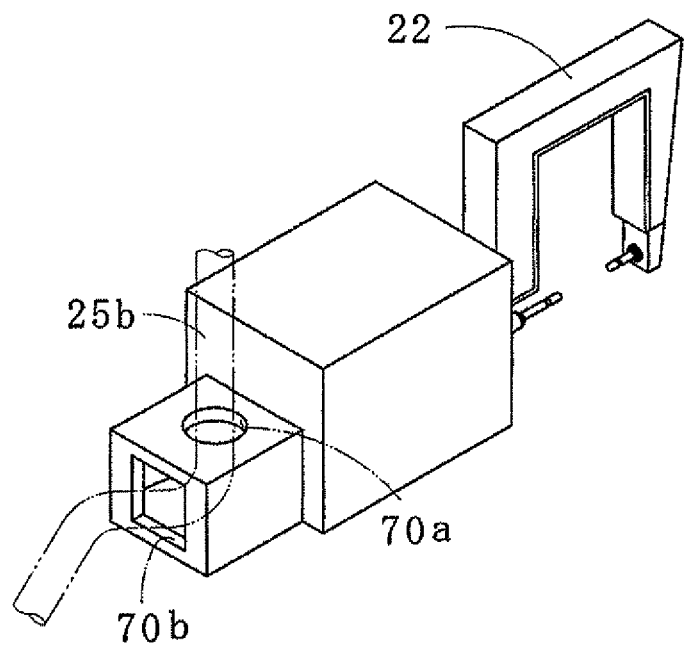
FIG. 4C is a perspective view depicting another example of the intermediate member of the robot.

The intermediate member 44 is fixed to the wrist flange 42. As shown in FIGS. 3C and 4A, a wiring route opened at one end to communicate with the hole 68 of the wrist flange 42 and opened at the other end in a direction differing from the direction of the joint axis J6 is defined in the intermediate member 44. The second cable bundle 25b can extend through the wiring route. More specifically, the intermediate member 44 includes a fixing portion 72 fixed to the wrist flange 42 and provided with a first opening portion 70a, and an end-effector attachment portion 74 to which the spot welding gun 22 is attached. The fixing portion 72 and the end-effector attachment portion 74 are interconnected by a connecting portion 76. The intermediate member 44 has a second opening portion 70b through which the second cable bundle 25b introduced into the first opening portion 70a is drawn out to the outside. The second opening portion 70b is preferably formed in the connecting portion 76 as shown in FIG. 4A but is not necessarily formed in the connecting portion 76. Alternatively, as shown in FIG. 4B, an opening portion 70c other than that formed in the connecting portion 76 may be used as the second opening portion. As shown in FIG. 4C, the intermediate member 44 may have no opening other than the first opening portion 70a and the second opening portion 70b. The intermediate member 44 may have an arbitrary shape, e.g., a cubic shape as illustrated in FIG. 4C. In the intermediate member 44, it is not always necessary that the surface of the fixing portion 72 facing the wrist flange 42 be parallel to the surface of the end-effector attachment portion 74 to which the spot welding gun 22 is attached.

At least one end of the wiring route defined in the intermediate member 44 needs to be opened to communicate with the hole 68 of the wrist flange 42. The other end of the wiring route may be arbitrarily opened to the outside so that the second cable bundle 25b can be drawn out to the outside.

Referring to FIG. 3B, the second cable bundle 25b extending from the cable bundle guide portion 35 of the upper arm 18 is fixed in place by fixtures 80a and 80b. When seen in a plan view, the second cable bundle 25b is arranged along the side surfaces of the first wrist arm 40a and the second wrist arm 40b (see FIG. 3B). The second cable bundle 25b is introduced into the hollow shaft 66 and extends through the first opening portion 70a of the intermediate member 44. Then, the second cable bundle 25b is drawn out to the outside through the second opening portion 70b of the intermediate member 44 and is connected to a connection port 82 of the spot welding gun 22 (see FIG. 1A). Since the second cable bundle 25b extends through the second wrist arm 40b, the wrist flange 42 and the intermediate member 44 (namely, through the wrist-arm bore portion 64, the hole 68 and the wiring route), it is possible to reduce the possibility that the second cable bundle 25b interferes with peripheral devices.

Referring to FIG. 3C, the intermediate member 44 is provided with a fixture 86. The second cable bundle 25b is fixed in place by the fixture 86 in the position just outside the second opening portion 70b. Alternatively, the fixture 86 may be provided within the intermediate member 44 or in the spot welding gun 22. It is only necessary that, when the wrist flange 42 is rotated about the joint axis J6, the fixture 86 can restrain the second cable bundle 25b from making contact with the intermediate member 44 (especially, the area around the second opening portion 70b).

While not shown in the drawings, a cable 88a connected to the sixth servo motor SM6 and a cable 88b connected to the encoder thereof (see FIGS. 3A and 3B) are drawn out from the second cable bundle 25b in between the fixture 80b fixed to the second wrist arm 40b and the upper end portion of the hollow shaft 66.

In the spot welding robot 10 according to the present embodiment, the first and second first cable bundles 25a and 25b are arranged as set forth above. The second cable bundle 25b is guided primarily by the cable bundle guide portion 35. The wrist unit 20 as a whole can rotate about the joint axis J4. The second cable bundle 25b is bent between the fixtures 80a and 80b, thereby allowing the second wrist arm 40b to rotate about the joint axis J5. The second cable bundle 25b is twisted within the hollow shaft 66 and the intermediate member 44, whereby the spot welding gun 22 can rotate about the joint axis J6.

According to the present embodiment, the portion of the second cable bundle 25b extending between the intermediate member 44 and the connection port 82 of the spot welding gun 22 is rotated together with the spot welding gun 22 and the intermediate member 44 as the spot welding gun 22 rotates about the joint axis J6. This helps restrain the second cable bundle 25b from interfering with the wrist unit 20 or the intermediate member 44 of the spot welding robot 10. This eliminates the possibility that a load great enough to disconnect the second cable bundle 25b is applied to the second cable bundle 25b.

In addition, the joint axes J5 and J6 are in a skew position with respect to each other. Therefore, as compared with a case where the joint axes J5 and J6 intersect one another, the second cable bundle 25b is restrained from interfering with the upper arm 18 (or the first wrist arm 40a) when the second wrist arm 40b rotates about the joint axis J5. This helps increase the operation extent of the second wrist arm 40b about the joint axis J5.

The present invention is not limited to the foregoing embodiment but may be modified without departing from the scope and spirit of the invention. For example, the foregoing embodiment and the modifications thereof may be combined partly or in their entirety. These combinations shall be construed to fall within the scope of the present invention.

While the spot welding robot 10 has been taken as an example in the foregoing embodiment, the present invention is not limited to the spot welding robot 10 but may be applied to an arc welding robot, a painting robot, a sealing robot, a grinding robot, a handling robot and other robots. In other words, the end effector may be a welding torch, a painting spray gun, a sealing nozzle, a grinding tool or a mechanical hand. The second cable bundle 25b may be a conduit cable, a paint supply hose, a sealant supply hose, an air hose for pneumatically-driven tools, a power line for electric power tools or the combination thereof.

In the foregoing embodiment, the hollow shaft 66 of the second wrist arm 40b is fixed to the wrist flange 42 and is driven through the timing belt 62 by the sixth servo motor SM6 whose rotation shaft is offset from the joint axis J6. Alternatively, the wrist flange 42 may be directly driven by a hollow motor having a hollow shaft rotating about the joint axis J6. In other words, the wrist flange 42 may be fixed to, and driven by, one end of the hollow shaft of the hollow motor. In this case, the second cable bundle 25b extends through the hollow shaft of the hollow motor.

What is claimed is:

1. A robot wrist structure, comprising:
    a first wrist arm rotatable about a first axis;
    a second wrist arm provided in a tip end portion of the first wrist arm and configured to swing about a second axis substantially intersecting the first axis;
    a wrist flange provided in a tip end portion of the second wrist arm and configured to rotate about a third axis in a skew position offset from the second axis such that the third axis does not intersect the second axis;
    an intermediate member having a fixing portion and an end-effector attachment portion, wherein a first opening is defined as a through-hole through said fixing portion and wherein the fixing portion is fixed to the wrist flange with the first opening aligned with said second axis; and
    a cable bundle connected to an end effector fixed to the intermediate member, the cable bundle extending through the second wrist arm, the wrist flange and the first opening of the intermediate member and being drawn out from a second opening of intermediate member to reach the end effector.

2. The structure of claim 1, wherein the second wrist arm includes a hollow portion opened at opposite ends along the third axis, the wrist flange includes a rotation center portion having a hole, the intermediate member is configured to define a wiring route whose at least one end communicates with the hole of the wrist flange, the cable bundle extends along a side surface of the first wrist arm and passes through the hollow portion, the hole and the wiring route to reach the end effector.

3. The structure of claim 1, wherein the end-effector attachment portion is attached to the end effector, and
    wherein the intermediate member further includes a connection portion interconnecting the fixing portion with the end-effector attachment portion, the second opening being defined as a through-hole through the connecting portion.

4. The structure of claim 3, wherein the cable bundle drawn out from the intermediate member is fixed in place by a fixture against contact with the cable bundle.

5. The structure of claim 1, wherein the second wrist arm includes a motor provided with a rotation shaft rotating about an axis offset from the third axis, and a hollow rotation body rotated by the motor about the third axis, the hollow rotation body being configured to drive the wrist flange, the cable bundle extending through the hollow rotation body.

6. A robot, comprising:
a swing arm;
a first wrist arm provided in a tip end portion of the swing arm and configured to rotate about a first axis;
a second wrist arm provided in a tip end portion of the first wrist arm and configured to swing about a second axis substantially intersecting the first axis;
a wrist flange provided in a tip end portion of the second wrist arm and configured to rotate about a third axis in a skew position offset from the second axis such that the third axis does not intersect the second axis;
an intermediate member having a fixing portion and a end-effector attachment portion, wherein a first opening is defined as a through-hole through said fixing portion and wherein the fixing portion is fixed to the wrist flange with the first opening aligned with said second axis; and
a cable bundle extending through the second wrist arm, the wrist flange and the first opening of the intermediate member, the cable bundle being drawn out from a second opening of the intermediate member.

7. A robot, comprising:
a swing arm;
a first wrist arm provided in a tip end portion of the swing arm and configured to rotate about a first axis;
a second wrist arm provided in a tip end portion of the first wrist arm and configured to swing about a second axis substantially intersecting the first axis;
a wrist flange provided in a tip end portion of the second wrist arm and configured to rotate about a third axis in a skew position with offset from the the second axis such that the third axis; does not intersect the second axis;
an intermediate member havinga fixing portion and an end-effector attachment portion, wherein a first opening is defined as a through-hole said fixing portion and wherein the fixing portion is fixed to the wrist flange with the opening alighed with said second axis;and
a cable bundle connected to an end effector fixed to the intermediate member, the cable bundle extending through the second wrist arm, the wrist flange and the the first opening of the intermediate member, the cable bundle being drawn out from a second opening of the intermediate member to reach the end effector.

8. The structure of claim 6, wherein the end-effector attachment portion is attached to the end effector, and
wherein the intermediate member includes a connecting portion interconnecting the fixing portion with the end-effector attachment portion, the second opening being defined asa through-hole the connecting portion.

9. The structure of claim 7, wherein the end-effector attachment portion is attached to the end effector, and
wherein the intermediate member further includes a connecting portion interconnecting the fixing portion with the end-effector attachment portion, the second opening being defined as a through-hole through the connecting portion.

* * * * *